United States Patent Office 2,814,622
Patented Nov. 26, 1957

2,814,622
ORGANIC COMPOUNDS

Robert B. Moffett, Kalamazoo, Mich., assignor to The Upjohn Company, Kalamazoo, Mich., a corporation of Michigan No Drawing. Application February 13, 1956,
Serial No. 564,852

5 Claims. (Cl. 260—243)

This invention relates to novel 10-(spiro[cycloalkane-1,2'-pyrrolidyl-1']-alkyl)-phenothiazines. This application is a continuation-in-part of application S. N. 522,847, filed July 18, 1955.

This invention has among its objects the provision of novel 10 - (spiro[cycloalkane-1,2' - pyrrolidyl-1'] - alkyl)-phenothiazines, which can exist in the form of the free bases, or coordination complexes thereof such as the sulfoxides, sulfoxide-amine oxides, the quaternary ammonium compounds, or addition complexes thereof such as the acid addition salts, sulfoxide acid addition salts, or sulfoxide-amine oxide acid addition salts. The novel compounds of this invention, in the form of the free base have the following general structural formula:

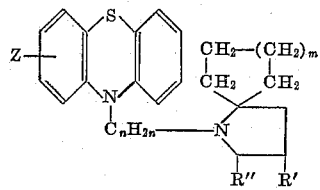

wherein Z is hydrogen or a halogen, lower-alkyl, or lower-alkoxy ring substituent, e. g., chlorine, fluorine, bromine, iodine, methoxy, ethoxy, methyl, ethyl, and the like, R' and R" are hydrogen or methyl, $m$ is a whole number from one to two, inclusive, $n$ is a whole number from two to six, inclusive, and —$C_nH_{2n}$— is an alkylene group which may be straight chain or branched and which has at least two carbon atoms between the valences. The term "lower" as used herein designates from one to eight carbon atoms, inclusive.

The novel compounds of this invention can be prepared by reacting certain phenothiazine compounds which will be described in detail in this specification with 2-spiro-substituted-pyrrolidyl compounds of Formulae IV and VI below. The latter may be prepared by the following series of reactions:

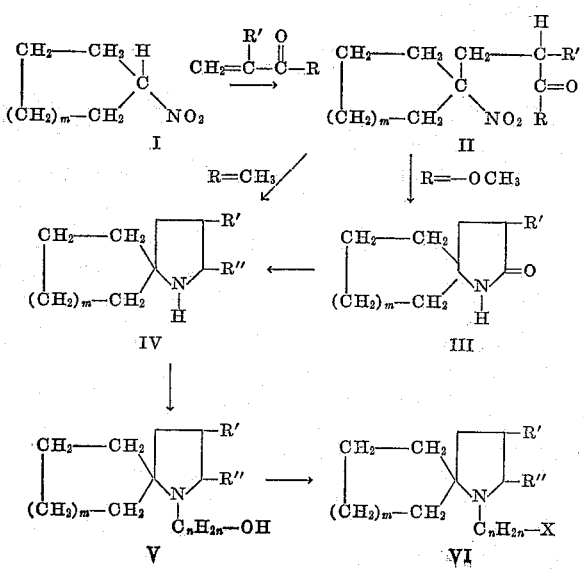

wherein $m$ is a whole number from one to two, inclusive, $n$ is a whole number from two to six, inclusive, R is lower-alkoxy, preferably methoxy or ethoxy, or methyl, R' and R" are hydrogen or methyl, and X is a halogen having an atomic weight from 35 to 127, inclusive, i. e., chlorine, bromine, or iodine. In Formulae V and VI, —$C_nH_{2n}$— is an alkylene group which may be straight chain or branched and which has at least two carbon atoms between the valences.

The 2-spiro-substituted-pyrrolidyl-alkyl halides (VI) and the 2-spiro-substituted-pyrrolidines (IV) may be reacted with 10-unsubstituted phenothiazines and 10-(ω-haloalkyl)-phenothiazines, respectively, to produce the compounds of this invention in accordance with the following processes A and B:

PROCESS A

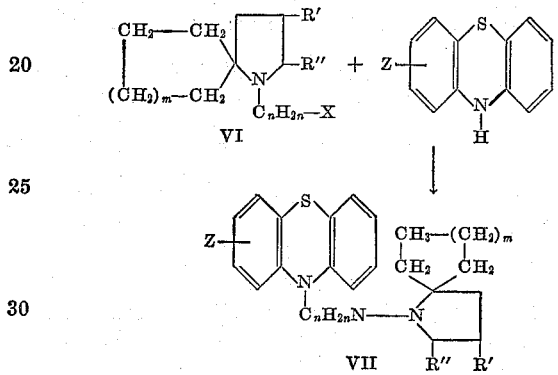

PROCESS B

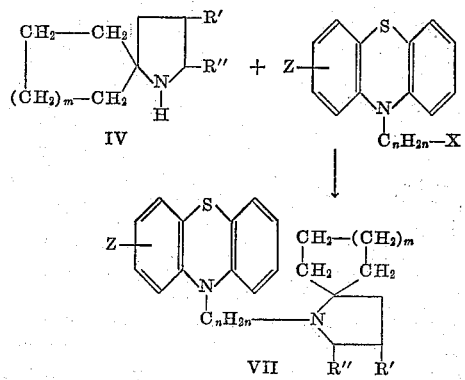

In the above formulae R', R", X, Z, $m$, $n$ and —$C_nH_{2n}$— have the values given hereinbefore.

Techniques for the above reactions are disclosed in U. S. Patent 2,645,640. In general the reactions are carried out in the presence of an alkaline condensing agent such as the alkali-metal hydroxides, amides, hydrides, or alkoxides, e. g., sodium hydroxide, potassium hydroxide, sodium amide, lithium amide, potassium methoxide, sodium ethoxide, lithium hydride, and the like. Suitable reaction media include benzene, toluene, and xylene, and the reactions are preferably carried out in a non-oxidizing atmosphere, as by heating in an atmosphere of nitrogen or other inert gas.

The 2-spiro-substituted-pyrrolidyl compounds (IV and VI) can be employed in the form of an acid addition salt, if desired, provided a proportionately larger quantity of alkaline condensing agent is employed.

Suitable 10-unsubstituted phenothiazines for reaction with 2-spiro-substituted-pyrrolidyl-alkyl halides (Process A) include phenothiazine, 1-fluorophenothiazine, 3-fluorophenothiazine, 2-chlorophenothiazine, 3-chlorophenothiazine, 4-chlorophenothiazine, 2-bromophenothiazine, 3-methoxyphenothiazine, 4-methylphenothiazine, and the like. Suitable 10-(ω-haloalkyl)-phenothiazines for reaction with 2-spiro-substituted-pyrrolidines (Process B) include 10-(β-chloroethyl)-phenothiazine, 10-(β-chloroethyl)-4-chloro-phenothiazine, 10-(γ-chloropropyl)-3-ethoxy-phenothiazine, 10-(β-chloropropyl)-2-chloro-phenothiazine, 10-(β-chloroethyl)-2-methyl-phenothiazine, 10-(β-chloroethyl)-4-isobutyl-phenothiazine, 10-(β-chloroethyl)-2-chloro-phenothiazine, and the like. In the specification and claims the positions of substituents on the phenothiazine nucleus are in accordance with Chemical Abstracts usage.

The novel compounds of this invention (Formula VII) are drug potentiators, tranquillizers, and antihistamines. They are usually administered orally, preferably as an acid addition salt, e. g., hydrochloride, hydrobromide, hydriodide, sulfate, citrate, acetate, succinate, nitrate; or as a quaternary ammonium salt, e. g., methobromide, methiodide, ethochloride; or as a sulfoxide, sulfoxide-amine oxide (prepared by oxidation of these compounds with a peracid or hydrogen peroxide), or acid addition salt thereof, etc. Suitable forms include tablets, stable aqueous solutions, elixirs, etc.

The preparation of the starting materials for the compounds of the present invention involves the conversion of a nitrocycloalkane (I) to a spiro-substituted-pyrrolidine (IV). In carrying out the first step of this conversion, a nitrocycloalkane (I) is condensed with an olefinic compound, preferably an alkyl acrylate, represented by the following formula:

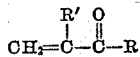

wherein R and R' have the values given hereinbefore and especially wherein R is lower-alkoxy, preferably methoxy or ethoxy, and R' is hydrogen, to produce a 1-(β-carbonylethyl)-nitrocycloalkane represented by Formula II. The reaction conditions described by Moffet and White, J. Org. Chem., 17, 407 (1952) can be employed using a condensing catalyst, preferably benzyltrimethylammonium hydroxide, sodium hydroxide, potassium hydroxide, or other strong base. Other bases, e. g., piperidine, pyrrolidine, morpholine, can also be used. The resulting product (II) can then be isolated and purified, e. g., in the manner described hereinafter, or the reaction mixture freed of solvent and used without isolation in the subsequent reduction reaction.

In the reduction step, a compound represented by Formula II is reductively cyclized to produce a spiropyrrolidine (IV) when R is methyl or a spiropyrrolidone (III) when R is lower-alkoxy. In the former case, the cyclization is accomplished with hydrogen and a hydrogenation catalyst, e. g., Raney nickel, etc. In the latter case, the hydrogenation is accomplished by hydrogenation with a suitable catalyst, e. g., in the manner described by Moffet and White (loc. cit.) and as described hereinafter, or by chemical means, e. g., zinc or iron in the presence of acid.

The conversion of a spiropyrrolidone (III) to a spiropyrrolidine (IV) can be accomplished with lithium aluminum hydride, or other chemical reducing agent capable of reducing a pyrrolidone to a pyrrolidine, or by high pressure hydrogenation according to techniques known in the art.

The alkylation of a spiropyrrolidine (IV) to an N-ω-hydroxyalkyl-spiropyrrolidine (V) can be accomplished by heating a spiropyrrolidine (IV) wtih a halohydrin, e. g., ethylene chlorohydrin, ethylene bromohydrin, propylene chlorohydrin, trimethylene chlorohydrin, etc., an alkylene oxide, e. g., ethylene oxide, propylene oxide, in the presence or absence of a solvent, or a halo ester followed by reduction of the thus-produced pyrrolidyl alkanoic acid ester with lithium aluminum hydride, e. g., according to methods known in the art [Moffet, J. Org. Chem., 14, 862 (1949) and previous papers referred to therein], to produce a 2-spirosubstituted-pyrrolidylalkanol (V). Examples of these alkanols include those represented by Formula V wherein the pyrrolidyl substituted alkanol group is ethanol, propanol, 1-methylethanol, 1-methylpropanol, 2-methylpropanol, 1,2-dimethylpropanol, 1,3-dimethylpropanol, 2,3-dimethylpropanol, 1,2,3-trimethylpropanol, butanol, pentanol, hexanol, 2,3-dimethylbutanol 1-methylpentanol, etc. group.

These pyrrolidylalkanols (V) can then be reacted with thionyl bromide, thionyl chloride, phosphorous tribromide, phosphorous trichloride, etc., to produce acid addition salts of pyrrolidylalkyl halides (VI), e. g., wherein the alkyl group is that of an alkanol named above and the hydroxy group has been replaced by a chlorine or bromine atom, e. g., in the manner described hereinafter and by Moffett et al., J. Am. Chem. Soc., 77, 1565 (1955).

The following preparations and examples are illustrative of the process and products of the present invention but are not to be construed as limiting.

PREPARATION 1.—METHYL β-(1-NITROCYCLOHEXYL)-PROPIONATE

In a one-liter, 3-necked flask fitted with stirrer, dropping funnel and thermometer were placed 333 grams (2.55 moles) of nitrocyclohexane (technical grade, redistilled), 300 milliliters of dioxane (lithium aluminum hydride-treated and redistilled) and thirty milliliters of a 35 percent methanolic solution of benzyltrimethylammonium hydroxide. To the resulting stirred mixture was added 227.5 grams (2.55 moles) of methyl acrylate (redistilled) over a period of fifteen minutes, during which time the temperature rose to about 100 degrees centigrade. When the temperature had dropped to about 55 degrees centigrade, the mixture was heated on a steam bath with stirring for three hours and then maintained at room temperature for about eighteen hours. The mixture was then diluted with about one liter of ether, acidified with dilute hydrochloric acid, extracted twice with a saturated aqueous sodium chloride solution, then with an aqueous sodium chloride solution containing a little sodium bicarbonate and finally with saturated aqueous sodium chloride solution. The organic layer was separated, dried and distilled through a Vigreux column. There was thus obtained 523.3 grams, a yield of 96.8 percent of the theoretical, of methyl β-(1-nitrocyclohexyl)-propionate distilling at between 96.5 degrees centigrade at a pressure of 0.05 millimeter of mercury absolute to 124.5 degrees at a pressure of 0.35 millimeter and having an $n_D^{25}$ of 1.4710. A sample was redistilled through a six-inch, helice-packed column to give a fraction boiling at 96 degrees centigrade at 0.025 millimeter pressure and having the analysis below.

Calculated for $C_{10}H_{17}NO_4$: C, 55.80; H, 7.96; N, 6.51. Found: C, 56.05; H, 8.02; N, 6.48.

PREPARATION 2.—SPIRO[CYCLOHEXANE-1,2'-PYRROLIDONE-5']

A solution of 453.3 grams (2.11 moles) of methyl β-(1-nitrocyclohexyl)-propionate in 1.26 liters of methanol-denatured ethanol (3A) was hydrogenated in the presence of Raney nickel catalyst for eighteen hours at fifty degrees centigrade. The mixture was cooled, filtered and the filtrate distilled to dryness at reduced pressure. The white crystalline residue was dissolved in two liters of boiling methylcyclohexane which was then distilled until about 100 milliliters had been collected, to remove any residual ethanol. The solution was clarified by pressure filtration while hot and then cooled. There was thus obtained 253 grams, a yield of 72 percent of the theoretical, of spiro[cyclohexane-1,2'-pyrrolidone-5'] melting 131 to 133 degrees centigrade. A further 31.4 grams of product melting at 129 to 132 degrees centigrade was obtained by concentration of the mother liquor. A sample recrystallized from Skellysolve B (hexane hydrocarbons) melted at 132 to 133 degrees centigrade and had the analysis below.

Calculated for C₉H₁₅NO: N, 9.14. Found: N, 9.03.

The product is a very weak base moderately soluble in water, very soluble in dilute mineral acids and unaffected by boiling twenty percent sodium hydroxide or sulfuric acid.

PREPARATION 3.—SPIRO[CYCLOHEXANE-1,2-PYRROLIDINE]

A mixture of 95 grams (2.5 moles) of lithium aluminum hydride and 1.5 liters of tetrahydrofuran (distilled from lithium aluminum hydride) was refluxed with stirring for a few minutes and then a solution of 206 grams (1.343 moles) of spiro[cyclohexane-1,2'-pyrrolidone-5'] dissolved in 1.1 liters of tetrahydrofuran was slowly added. The stirred mixture was then heated at its refluxing temperature for eighteen hours. About two liters of solvent was removed by distillation and the following were slowly added to the residue in succession: one liter of U. S. P. ether, 200 milliliters of ethyl acetate, and one liter of concentrated hydrochloric acid dissolved in 1.5 liters of water. The strongly acidic solution was steam distilled until a distillation temperature of 100 degrees centigrade was reached. To the hot residue was added about 1,760 grams of aqueous fifty percent sodium hydroxide. The mixture was then steam distilled until practically no basic material came over with the distillate. The four liters of basic distillate was extracted twice with about one-liter portions of ether. The extracted aqueous layer was then subjected to continuous extraction with ether for six hours. The combined ether extracts were thoroughly dried with anhydrous potassium carbonate.

This procedure was followed on another run employing 83.5 grams of lithium aluminum hydride, 168.5 grams of spiro[cyclohexane-1,2'-pyrrolidone-5'] and two liters of tetrahydrofuran.

The combined runs were distilled through a twelve-inch column packed with ⅛-inch helices. After the solvent had been removed, the residue was distilled at reduced pressure. There was obtained a 286 gram fraction of spiro[cyclohexane-1,2'-pyrrolidine] distilling at 99 to 104 degrees centigrade at a pressure of 42 millimeters of mercury absolute and having $n_D^{25}$ of 1.4817 and the analysis below.

Calculated for C₉H₁₇N: C, 77.63; H, 12.31; N, 10.06. Found: C, 77.95; H, 11.88; N, 9.24.

PREPARATION 4.—β-SPIRO[CYCLOHEXANE-1,2'-PYRROLIDYL-1']-ETHANOL

A stirred mixture of 27.84 grams (0.2 mole) of spiro[cyclohexane-1,2'-pyrrolidine] and 16.1 grams (0.2 mole) of ethylene chlorohydrin in a 100-milliliter, round-bottomed flask fitted with a thermometer, reflux condenser and magnetic stirrer was rapidly heated to 120 degrees centigrade. The heat was removed as the mixture spontaneously rose to about 167 degrees centigrade. When the temperature had dropped to 120 degrees centigrade, the flask was again heated at 130 to 150 degrees centigrade for fifteen minutes. The cooled solution was mixed with thirty milliliters of aqueous fifty percent sodium hydroxide and then extracted thoroughly with four portions of ether. The combined ether extracts were dried with potassium carbonate, filtered and the ether removed by distillation. The residue was distilled through a six-inch column packed with ⅛-inch helices. After a forerun of spiro[cyclohexane-1,2'-pyrrolidine] was removed, there was obtained 23.3 grams of β-spiro[cyclohexane-1,2'-pyrrolidyl-1']-ethanol distilling at 138 degrees centigrade at an absolute pressure of twelve millimeters of mercury. A sample taken from the center cut of the distillate had an $n_D^{25}$ of 1.5010 and the analysis below.

Calculated for C₁₁H₂₁NO: C, 72.08; H, 11.55; N, 7.64. Found: C, 72.41; H, 11.87; N, 7.66.

β-Spiro[cyclohexane-1,2'-pyrrolidyl-1']-ethanol hydrochloride was prepared by adding an excess of anhydrous hydrogen chloride to a cooled solution of β-spiro[cyclohexane-1,2'-pyrrolidyl-1']-ethanol in benzene. The precipitated, crystalline hydrochloride was filtered. A sample recrystallized from isopropyl alcohol gave β-spiro[cyclohexane-1,2'-pyrrolidyl-1']-ethanol hydrochloride melting at 177.5 to 179 degrees centigrade and having the analysis below.

Calculated for C₁₁H₂₂ClNO: Cl, 16.13. Found: Cl, 16.30.

PREPARATION 5.—γ-SPIRO[CYCLOHEXANE-1,2'-PYRROLIDYL-1']-PROPANOL

Following the procedure of Preparation 4, but employing 27.84 grams (0.2 mole) of spiro[cyclohexane-1,2'-pyrrolidine] and 18.9 grams (0.2 mole) of trimethylene chlorohydrin, there was thus obtained 23.43 grams of γ-spiro[cyclohexane-1,2'-pyrrolidyl-1']-propanol distilling at 155 degrees centigrade at an absolute pressure of 11.5 millimeters of mercury, having an $n_D^{25}$ of 1.4979 and the analysis below.

Calculated for C₁₂H₂₃NO: N, 7.10. Found: N, 7.12.

PREPARATION 6.—β-SPIRO[CYCLOHEXANE-1,2'-PYRROLIDYL-1']-ETHYL CHLORIDE HYDROCHLORIDE

A cooled, rapidly stirred solution of 121 grams (0.676 mole) of β-spiro[cyclohexane-1,2'-pyrrolidyl-1']-ethanol in 250 milliliters of benzene was saturated with anhydrous hydrogen chloride gas. Nitrogen was bubbled through the mixture to remove some of the excess hydrogen chloride and the flask then cooled to about zero degrees centigrade. To the cooled solution was slowly added sixty milliliters (0.88 mole) of thionyl chloride. The mixture became homogeneous. The solution was refluxed for two hours, with stirring, during which time the desired product precipitated. The precipitated crystals were filtered and washed with benzene and then with absolute ether to give 158 grams, a yield of 98 percent of the theoretical, of β-spiro[cyclohexane-1,2'-pyrrolidyl-1']-ethyl chloride hydrochloride melting at 239 to 240 degrees centigrade and having the analysis below.

Calculated for C₁₁H₂₁Cl₂N: Cl, 29.77. Found: Cl, 29.50.

PREPARATION 7.—γ-SPIRO[CYCLOHEXANE-1,2'-PYRROLIDYL-1']-PROPYL CHLORIDE HYDROCHLORIDE

Following the procedure described in Preparation 6, but employing 22.4 grams of γ-spiro[cyclohexane-1,2'-pyrrolidyl-1']-propanol, fifty milliliters of benzene and fifteen milliliters of thionyl chloride, there was thus obtained 26.8 grams of γ-spiro[cyclohexane-1,2'-pyrrolidyl-1']-propyl chloride hydrochloride melting at 224 to 227 degrees centigrade. A sample recrystallized from isopropyl alcohol melted at 225 to 227 degrees and had the analysis below.

Calculated for C₁₂H₂₃Cl₂N: Cl, 28.11. Found: Cl, 28.07.

*Example 1.—10-(β-spiro[cyclohexane-1,2'-pyrrolidyl-1']-ethyl)-phenothiazine hydrochloride hydrate*

A stirred mixture of fourteen grams (0.07 mole) of phenothiazine, 100 milliliters of dry toluene, and 2.93 grams (0.075 mole) of sodium amide was heated in a nitrogen atmosphere for two hours at its refluxing temperature. To the cooled vigorously stirred solution was added dropwise, over a period of fifteen minutes, 83.3 milliliters of a solution containing 0.075 mole of β-(spiro[cyclohexane-1,2'-pyrrolidyl-1'])-ethyl chloride in toluene. The resulting mixture was heated at its refluxing temperature for nineteen hours, cooled, washed with water and then shaken with 400 milliliters of water containing fifteen milliliters of concentrated hydrochloric acid. An oil separated which soon crystallized. The solid was collected, washed with water, ether and then dried to give 26.8 grams of tan crystals of 10-(β-spiro[cyclohexane-1,2'-pyrrolidyl-1']-ethyl)-phenothiazine hydrochloride hydrate melting at 107 to 130 degrees centigrade with decomposition. These crystals, when recrystallized from water, gave 25.7 grams, a yield of 77.5 percent of the theoretical, of product melting at 120 to 130 degrees centigrade with decomposition and having the analysis below.

Calculated for $C_{23}H_{29}ClN_2S \cdot H_2O$: C, 65.93; H, 7.46; N, 6.69; Cl, 8.46; S, 7.65. Found: C, 66.10; H, 7.59; N, 6.47; Cl, 8.54; S, 7.96.

*Example 2.—2-chloro-10-(γ-spiro[cyclohexane-1,2'-pyrrolidyl-1']-propyl)-phenothiazine*

A stirred mixture of 11.7 grams (0.05 mole) of 2-chlorophenothiazine, 2.06 grams (0.053 mole) of sodium amide and 75 milliliters of dry toluene was heated in a nitrogen atmosphere at its refluxing temperature for two hours. A dried solution of γ-(spiro[cyclohexane-1,2'-pyrrolidyl-1'])-propyl chloride in toluene (prepared by mixing 13.4 grams of γ-(spiro[cyclohexane-1,2'-pyrrolidyl-1'])-propyl chloride hydrochloride in water with nine milliliters of aqueous fifty percent sodium hydroxide and then extracting with about 100 milliliters of toluene), was slowly added to the cooled vigorously stirred solution of the sodium salt of 2-chlorophenothiazine. The mixture was heated at its refluxing temperature for eight hours and then maintained at room temperature for eighteen hours. The mixture was washed twice with water which was then extracted with ether. The combined toluene and ether solutions were shaken with dilute hydrochloric acid. An oily insoluble hydrochloride precipitated. The combined aqueous and hydrochloride layers were washed with ether and then made alkaline with sodium hydroxide. The oily free base which precipitated soon crystallized. The solid was filtered, washed with water and dried to give 2-chloro-10-(γ-spiro[cyclohexane -1,2'- pyrrolidyl -1']- propyl)- phenothiazine melting at 108 to 112 degrees centigrade and, after decolorization with activated charcoal and crystallization from ethyl acetate, melting at 114 to 116 degrees centigrade and having the analysis below.

Calculated for $C_{24}H_{29}ClN_2S$: C, 69.79; H, 7.08; Cl, 8.58. Found: C, 69.83; H, 7.08; Cl, 8.21, 8.78.

Following the procedure of Example 1, above, approximately equal molar proportions of phenothiazine and β-(spiro[cyclohexane - 1,2' - pyrrolidyl-1']-propyl chloride can be reacted in toluene to produce 10-(β-spiro[cyclohexane-1,2'- pyrrolidyl-1']-propyl)- phenothiazine hydrochloride. Likewise, approximately equal molar proportions of 3-methoxyphenothiazine and β-(spiro[cyclohexane-1,2'-pyrrolidyl-1'])-ethyl chloride can be reacted in toluene to produce 3-methoxy-10-(β-spiro[cyclohexane-1,2'-pyrrolidyl-1']-ethyl)-phenothiazine hydrochloride.

In a manner similar to the procedure of Example 2, 2-bromophenothiazine can be substituted for the 2-chlorophenothiazine to produce 2-bromo-10-(γ-spiro[cyclohexane-1,2'-pyrrolidyl-1']- propyl)- phenothiazine. Likewise, approximately equal molar proportions of phenothiazine and β-(spiro[cyclopentane-1,2'-pyrrolidyl-1'])-ethyl chloride (prepared by reacting spiro[cyclopentane-1,2'-pyrrolidine] with ethylene chlorohydrin to produce β-spiro[cyclopentane-1,2'-pyrrolidyl-1']-ethanol and subsequently reacting the latter in the form of its hydrochloride with thionyl chloride) can be used in the procedure of Example 1 to produce 10-(β-spiro[cyclopentane-1,2'-pyrrolidyl-1']-ethyl)-phenothiazine hydrochloride.

Following the procedure of Example 1, but substituting hydrobromic, hydriodic, sulfuric, phosphoric, acetic, citric, succinic, or nitric acid for the hydrochloric acid, the corresponding hydrobromides, hydriodides, sulfates, phosphates, acetates, citrates, succinates or nitrates of the foregoing 10-(spiro[cycloalkane-1,2'-pyrrolidyl-1']-alkyl)-phenothiazines can be produced. By reacting the novel 10-(spiro[cycloalkane-1,2'- pyrrolidyl-1']- alkyl)-phenothiazines of this invention, preferably in the form of their salts with an equimolar amount of hydrogen peroxide, the corresponding sulfoxides can be produced.

The same type of oxidation, using at least two moles of hydrogen peroxide per mole of the phenothiazine compound, performed on the free base, is productive of the corresponding sulfoxide-amine oxides. Both these oxide compounds, in the form of the free bases, can be converted into their acid addition salts by reaction with acids, e. g., those enumerated above.

The compounds of the examples, preferably in the form of the free bases, can be readily converted into quaternary ammonium compounds by reaction in an inert reaction medium with alkyl, alkenyl, or aralkyl halides, e. g., methyl bromide, methyl iodide, ethyl chloride, allyl bromide, benzyl chloride, and the like.

The product of Example 1 possesses strong potentiating properties as shown by the hexobarbital sleeping time. The product of Example 2 likewise possesses potentiating properties as evidenced by the same assay. In this particular test the compound is injected intraperitoneally in a mouse. After thirty minutes the mouse is injected with a standard dosage of hexobarbital sodium. The period of continued sleep affords a means of evaluating the potentiating properties of the compound.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. A compound selected from the group consisting of a 10 - (spiro[cycloalkane - 1,2' - pyrrolidyl - 1'] - alkyl)-phenothiazine of the following structural formula:

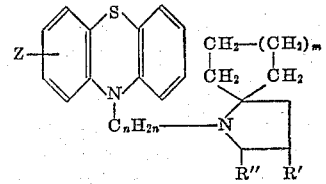

wherein Z is a member of the group consisting of hydrogen, halogen, lower-alkyl, and lower-alkoxy radicals, R' and R" are each a member of the group consisting of hydrogen and methyl, m is a whole number from one to two, inclusive, n is a whole number from two to six, inclusive, and —$C_nH_{2n}$— is a lower alkylene radical with at least two carbon atoms between the valences.

2. 10 - (β - spiro[cyclohexane - 1,2' - pyrrolidyl - 1']-ethyl)-phenothiazine of the following structural formula:

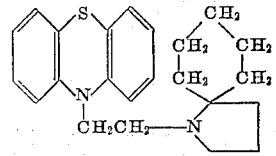

3. 2 - chloro - 10 - (γ - spiro[cyclohexane - 1,2'-pyrrolidyl - 1'] - propyl) - phenothiazine of the following structural formula:

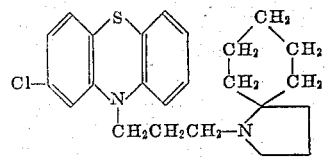

4. 10 - (β - spiro[cyclohexane - 1,2' - pyrrolidyl - 1']-ethyl)-phenothiazine hydrochloride.

5. 2 - chloro - 10 - (γ - spiro[cyclohexane - 1,2'-pyrrolidyl - 1'] - propyl) - phenothiazine hydrochloride.

References Cited in the file of this patent

UNITED STATES PATENTS

| | | |
|---|---|---|
| 2,483,998 | Hunter et al. | Oct. 4, 1949 |
| 2,645,640 | Charpentier | July 14, 1953 |
| 2,687,414 | Cusic | Aug. 24, 1954 |